Oct. 29, 1935.  A. CUNNINGHAM ET AL  2,019,120
AUTO SAFETY RIM
Original Filed Aug. 2, 1933

Inventors:
Archibald Cunningham
and Frank Luley.
By A. M. Plaisted,
Attorney.

Patented Oct. 29, 1935

2,019,120

UNITED STATES PATENT OFFICE 2,019,120

AUTO SAFETY RIM

Archibald Cunningham and Frank Luley, St. Louis, Mo.

Application August 2, 1933, Serial No. 683,304
Renewed May 3, 1935

1 Claim. (Cl. 301—39)

This invention relates to certain new and useful improvements in auto safety rims, the peculiarities of which will be hereinafter fully described and claimed.

The main objects of our invention are to provide means first, for an emergency rim device that will instantly function to assume the load on a wheel in the event of a blow-out of the adjacent tire casing; second, for such a safety rim device as a slip-on attachment to the usual or standard auto wheel rim; third, for using the lateral pressure of the inflated tire to hold the safety rim closely against the inside of the inner flange of the wheel rim to avoid rattling of the safety rim; and fourth, for causing the safety rim to bear directly on the wheel rim and in case of a blow-out or collapse of the tire, to transmit the carrying stress on the safety rim directly to the wheel rim.

Figure 2:
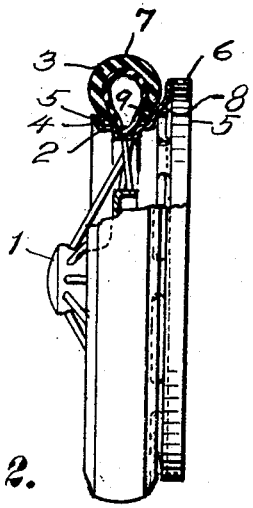
Figure 1:
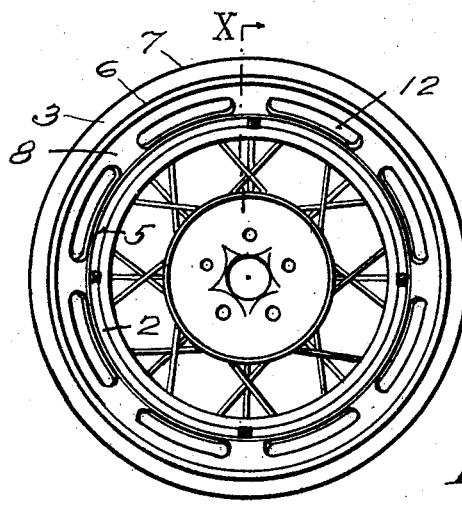
Figure 3:
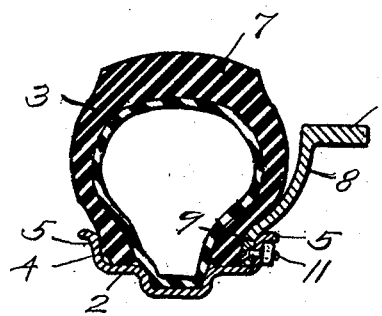
Figure 4:
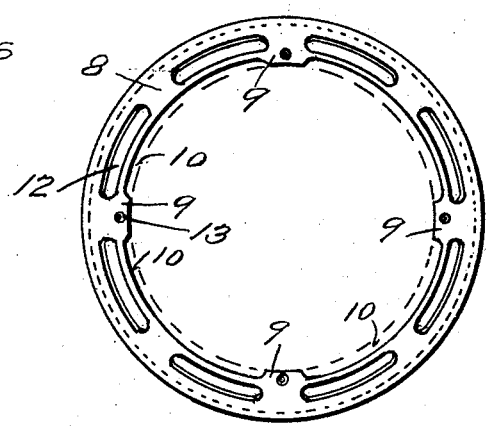

In the accompanying drawing in which like reference numerals indicate corresponding parts, Fig. 1 represents an elevation of the inner face of an auto wheel with our improved safety rim device applied thereto;

Fig. 2, an edge view of the same partly in section on the line X of Fig. 1;

Fig. 3, an enlarged section of a drop center rim, its inflated tire and our safety rim device; and Fig. 4, a detail view of our safety rim showing the side opposite to that shown in Fig. 1.

In prior emergency wheels for use in the event of the blow-out of an auto tire, the clamps, bolts and such fastening means for holding them in position require considerable construction change and consequent expense in attachment; also they are liable to work loose in the normal use of the auto and rattle.

Our safety rim is designed to slip on the usual or standard wheel rim with little or no structural change so as to bear on the outer circumferential face of the wheel rim and against the inner face of one of the flanges, preferably the inner flange. Our rim thus bears directly on the wheel rim, and its bearing portions are held against the inside of the adjacent wheel flange mainly by the resilient pressure of the inflated tire, and such pressure obviates any play or rattle.

Referring to the drawing the numeral 1 designates an auto wheel center having a continuous rim 2 of the usual drop center or other type having flanges of fixed diameter and equal height as shown, for mounting a pneumatic tube and casing 3 on its cylindrical face 4 between its flanges 5.

Our safety rim consists of a flat circular band or tread portion 6 having a radius approximately 1¼" less than the casing tread 7, and adapted to bear on the ground when the casing is collapsed by a blowout.

An annular web portion 8 is curved laterally inward from the tread band and spaced from but corresponding to the side contour of the casing, till it becomes nearly vertical corresponding to the inner flange 5 so as to fit snugly against the inner face of said flange and have its inner peripheral edge bear against the straight cylindrical face 4 of the wheel rim, by bearing portions 9. This inner edge is cut outward forming elongated clearance notches 10 between said bearing portions, the latter forming multiple prongs to contact, at four or more points, with said cylindrical rim as indicated in Fig. 4 and Fig. 3. In the lighter makes of auto, four bearing prongs are used, but in heavier machines more are preferable.

The said notches between the prongs facilitate a snug fit of the bottom edges against the cylindrical rim; they also provide clearance for the prongs to pass over the flange 5 in disposing the safety rim on the wheel rim. In so mounting the safety rim, one of said notches is placed in the drop center groove so that the safety rim is tipped eccentric to the wheel center and the prongs on the opposite side clear the wheel flange as the safety rim is slipped over the outer flange; then all the prongs are brought to a snugly fitting engagement on the wheel rim, with the vertical web portions of the safety rim close against the inner face of the wheel flange. After the safety rim is thus located, the tire is mounted on the wheel rim and inflated so that the vertical prong portions of the web are pressed laterally against the adjacent wheel flange by the expanded tire. This forms a resilient or cushion clamp for the safety rim, which is better than a rigid fastening under the shocks and vibration of motor travel, and avoids a rattling connection.

When a tire collapses, it is pressed inward against its rim and laterally against the safety rim which then acts as an emergency wheel or filler between the wheel rim and the ground so that both wheel rim and safety rim function together in carrying their corresponding portions of the weight of the machine.

The annular curved web portion 8 flares away from the inflated tire (Fig. 3), leaving a space for lateral spread of the casing in contact with the ground. Pebbles are liable to be forced into said space, and elongated openings 12 parallel to the flange, are provided in said web portion outside the flange, to facilitate their discharge or removal.

Countersunk holes 13 are provided in the prongs for screw head bolts 11 to resist any lateral stress tending to warp the safety rim from its vertical position; such bolts take no inward radial stress, nor do they bear any of the weight of the car when the safety rim is in ground contact, as such weight is carried directly by the combined wheel rim and safety rim as above stated.

We do not confine our invention to the exact construction shown, except by the following claim.

We claim:

The combination with a continuous auto wheel rim having flanges of equal height and fixed diameter, and a pneumatic tube and casing mounted thereon, of a safety rim comprising a band forming an emergency tread having an annular web portion the inner peripheral edge of which is cut outward forming elongated notches and intermediate bearing portions provided with holes, said notches providing clearance for passing said bearing portions over one of said flanges to seat them adjacent one flange, and fastening bolts securing said bearing portions to the adjacent flange, substantially as described.

ARCHIBALD CUNNINGHAM.
FRANK LULEY.